United States Patent [19]
Taylor

[11] 3,718,726
[45] Feb. 27, 1973

[54] METHOD OF MAKING SHOE BOTTOM MOLD SEALS

[75] Inventor: John J. Taylor, Leicester, England

[73] Assignee: USM Corporation, Boston, Mass.

[22] Filed: Jan. 21, 1971

[21] Appl. No.: 108,372

[30] Foreign Application Priority Data

Jan. 24, 1970 Great Britain..................3,537/70

[52] U.S. Cl..............................264/219, 264/244
[51] Int. Cl..........................B29c 1/02, A43d 65/00
[58] Field of Search......264/244, 276, 219, 220, 225, 264/221, 267, 269, 226; 18/DIG. 18; 249/83

[56] References Cited

UNITED STATES PATENTS

| | | |
|---|---|---|
| 3,441,643 | 4/1969 | Tusa et al. ..........................264/244 |
| 3,314,640 | 4/1967 | Snow..........................249/83 |
| 2,708,773 | 5/1955 | Bacon..........................264/219 |
| 2,955,322 | 10/1960 | Hite..........................264/267 X |
| 3,018,519 | 1/1962 | Morin et al. ..........................264/269 X |
| 3,399,589 | 9/1968 | Breed..........................264/268 X |
| 3,536,806 | 10/1970 | Jackson..........................264/268 |

*Primary Examiner*—Robert F. White
*Assistant Examiner*—Willard E. Hoag
*Attorney*—Richard A. Wise, Richard B. Megley and Vincent A. White

[57] ABSTRACT

A shoe sole mold having movable side mold members including plates engaging the side of a shoe with resilient sealing members on the plates and compressible against the shoe for sealing the mold cavity and a method of making said mold.

2 Claims, 3 Drawing Figures

Inventor
John J. Taylor
By his Attorney
Vincent A. White

METHOD OF MAKING SHOE BOTTOM MOLD SEALS

BACKGROUND OF THE INVENTION

It is well known to injection mold shoe bottoms onto shoes using a mold assembly comprising a sole mold and two side molds mounted at the sides of the sole mold for movement between open positions spaced from the sole mold and closed positions in which the side molds abut against each other and define, together with the sole mold, a mold cavity the form of a shoe bottom unit. In the use of such a mold assembly, a shoe upper is mounted on a foot form which is then moved into an operative position facing, and separated from, the sole mold. The side molds are then closed around the sole mold and foot form, and welt closure portions of the side molds engage the feather line of the upper and press the upper against the foot form. A fluid plastic material is then injected into the mold cavity to solidify and to provide a molded shoe bottom adhered to the bottom of the shoe upper assembly.

One difficulty involved in the use of such mold assemblies involves the requirement that the welt closure portions of the side molds have a contour closely similar to that of the feather line of the shoe being made. Whereas the resilience of the upper material enables a small degree of dissimilarity to be accommodated, variations particularly in the shoemaking steps involved prior to the production of a shoe upper assembly ready for mounting on the foot form are often encountered which result in an incomplete sealing between the closure portions and the upper sufficient to allow the fluid bottom forming plastics material to escape from the mold cavity between the closure portions and the upper in the form of so-called spue. Such spue must be removed from the shoe on completion of the molding operation, requiring a separate undesirable manual operation. In certain circumstances, the upper material may also be damaged by the spue or the bottom unit may be malformed, resulting in the scrapping of the shoe produced. The problem of the formation of spue is particularly serious when the fluid plastics material for the bottom unit is provided by a low viscosity material such as a polyurethane-producing mixture.

It is a general object of the invention to provide an improved mold assembly which overcomes the above objection and an improved method by which the mold assembly may be made. To this end, the mold assembly comprises a plurality of mold members adapted to provide a mold cavity the form of a shoe bottom unit and includes two side molds each having a substantially unyielding welt closure portion adapted to engage a shoe upper assembly along the periphery of the shoe bottom, otherwise known as the feather line. A resiliently deformable sealing member extends upwardly from the welt closure portion and has a leading face complementary to the feather line of the shoe and extending beyond the complementary face of the welt closure. Thus, on closing movement of the side molds, the leading face of the sealing member engages the upper assembly prior to completion of closing movement of the side molds and the sealing members are compressed, insuring a tight seal by the time the face of the welt closures engage the upper. Such a mold construction avoids spuing of even low viscosity material.

The invention also provides a method of making the above mold assembly and includes the steps of: providing a mold assembly comprising a plurality of molds adapted to form a mold cavity in the form of a shoe bottom unit and including two movable side molds; providing each side mold with a substantially unyielding welt closure portion adapted to engage the feather line of a shoe upper assembly mounted on a foot form positioned in an operative position relative to the mold assembly; mounting a model of the shoe in an operative position relative to the mold assembly; moving the side molds toward closed positions in which the welt closure portions are spaced outwardly from the feather line of the mold, and casting onto each of the welt closure portions around the feather line of the model a sealing member of a resiliently deformable material.

The above and other of the various objects and several features of the invention will become more clear from the following detailed description, to be read with reference to the accompanying drawings, of the illustrative mold assembly and the illustrative method. It will be appreciated that both the mold assembly and method have been selected to illustrate the invention by way of example only and not by way of limitation thereof.

Figure 2:
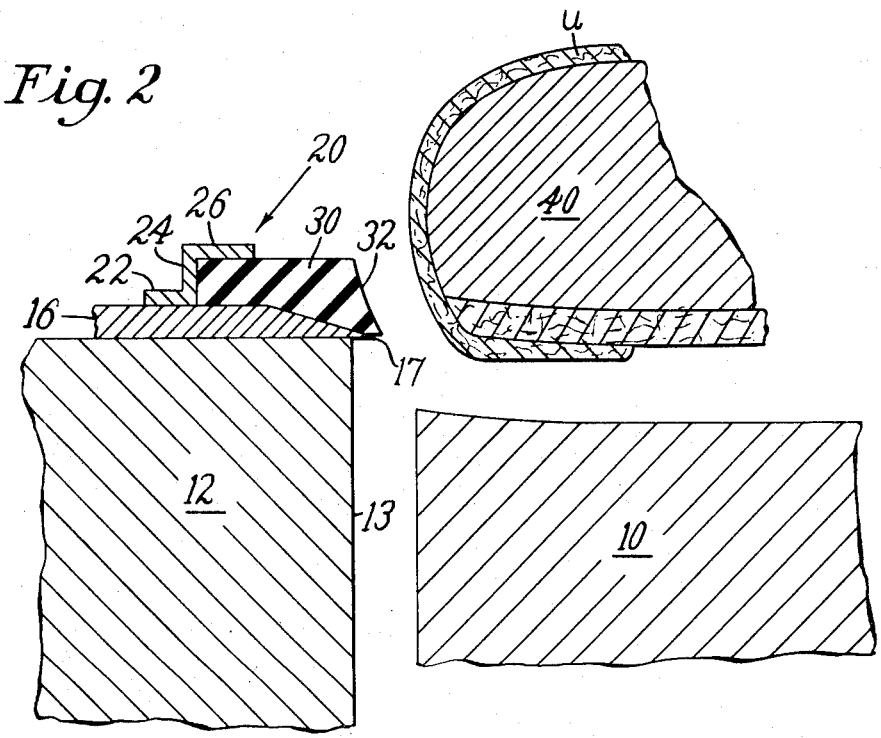
FIG. 2 is a partial side section of the illustrative mold assembly in an open condition.
Figure 3:
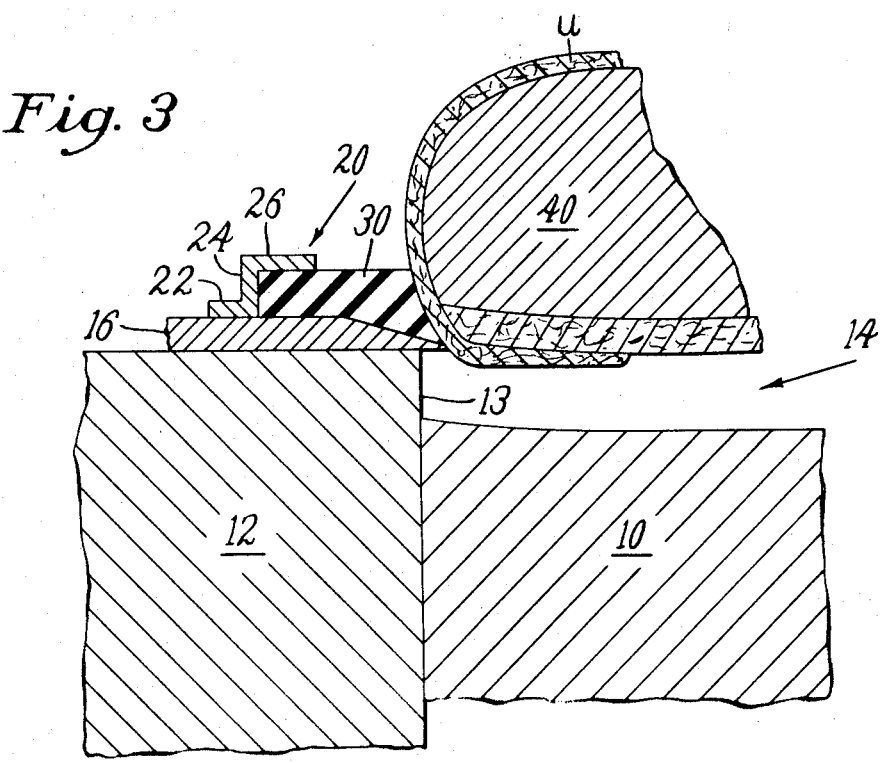
FIG. 3 is a similar side section of the mold assembly in a closed condition.

The illustrative mold assembly (FIGS. 2 and 3) comprises a base plate (not shown), a sole mold 10 secured to the base plate and two side molds 12 slidably mounted on the base plate at opposite sides of the sole mold for movement between open positions (FIG. 2) and closed positions (FIG. 3). In their closed positions, the side molds abut against each other and against the sole mold 10 and provide together with the sole mold 10 a mold cavity 14 the form of a shoe bottom unit.

Each side mold 12 comprises a welt closure portion provided by a welt plate 16 of metal or the like secured to an upper surface of the side mold and projecting beyond an inwardly facing surface 13 of the side mold. An elongated bracket member 20 is secured by a flat mounting portion 22 to an upper surface of the welt plate 16 of each side mold 12 with a wall 24 of the bracket spaced a uniform distance from a leading edge portion 17 of the welt plate. Each bracket has a roof portion 26 extending from the wall generally inwardly of the mold assembly. An elongated resiliently deformable sealing member 30 is located on the upper surface of the welt plate and is contained by the wall and roof portions 24 and 26 of the bracket 20. A leading face 32 of each sealing member is contoured, and a portion thereof adjacent the upper surface of the welt plate 16 projects beyond the leading edge portion 17 of the welt plate.

In the use of the mold assembly, a shoe upper assembly u is mounted on a foot form 40 which, with the mold assembly in an open condition, is moved to an operative position, as seen in FIG. 2, between the open side molds 12. The bottom of the upper assembly faces and is spaced from the sole mold 10. The mold assembly is then moved to a closed condition by movement of the side molds 12 to their closed positions as seen in FIG. 3. Just prior to completion of the closing movements of the side molds the faces 32 of the sealing members 30 engage around the upper assembly *u* above the feather line thereof. The contours of the leading faces 32 of the sealing members are complementary to the contours of the portions of the upper assembly they engage and, upon completion of movement of the side molds into their closed positions, the faces 17 of the welt plates engage the feather line of the upper assembly, the sealing members 30 being pressed against the upper assembly to provide a complete seal between the side molds and the upper assembly. A fluid polyurethane-forming, or other bottom-forming, mixture is then injected into the closed mold cavity; and upon solidification of the material, the mold assembly is opened and a completed shoe, comprising the upper assembly *u* and a shoe bottom molded thereto, is removed from the foot form 40.

Figure 1:
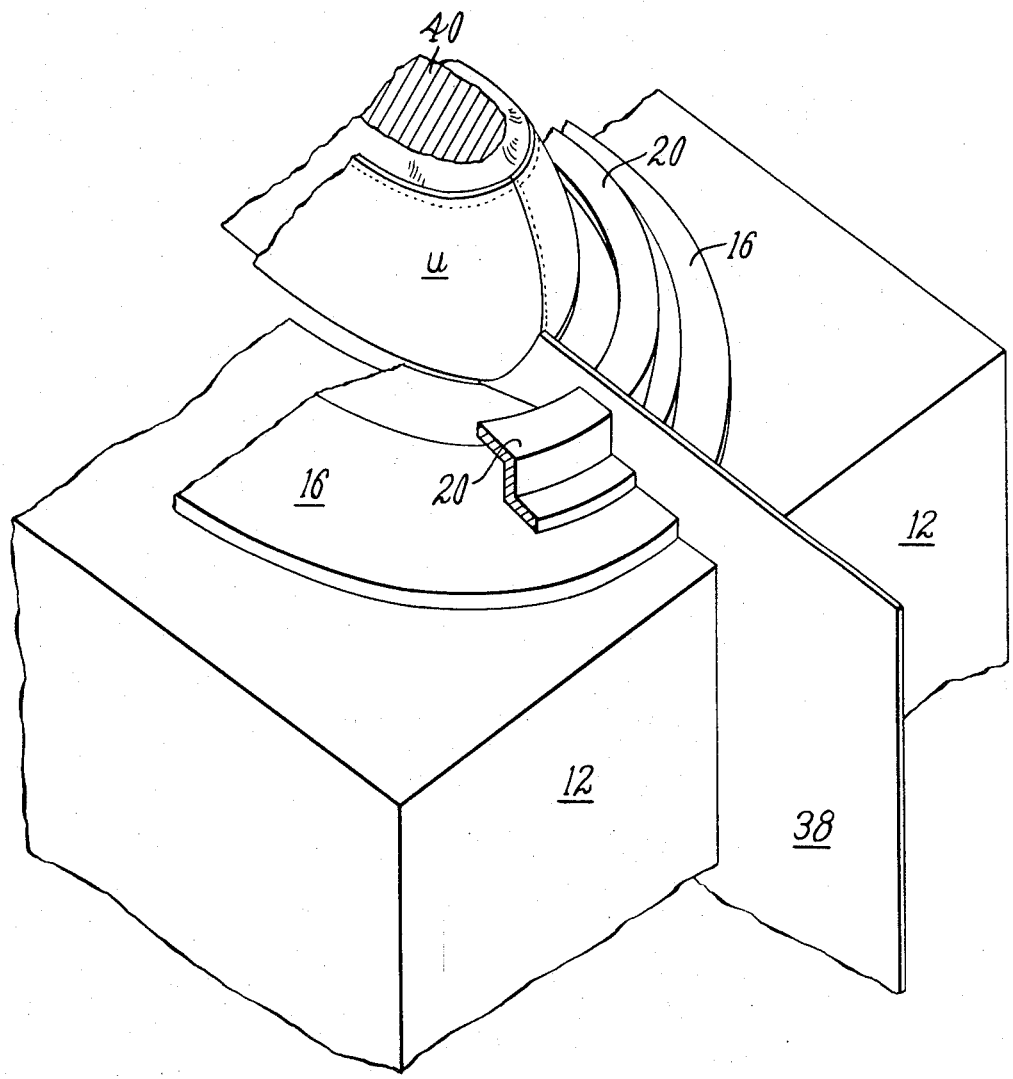
FIG. 1 is a perspective view showing a stage in the making of the illustrative mold assembly by use of the illustrative method, part of the mold assembly having been broken away.

In the illustrative method of making the mold assembly, a mold assembly comprising the base plate, sole mold 10 and side molds 12 is procured. The brackets 24 are each secured to the upper surface of the welt plate 16 of each of the two side molds such as by welding or otherwise attaching the mounting portion 22 of the welt plates along a line uniformly spaced from the leading edge portion 17 thereof. A model of the shoe onto which by use of the mold assembly a shoe bottom is to be molded is provided, for example, by a lasted upper assembly mounted on a foot form 40 of style and size similar to said shoe. The side margin of the model adjacent the feather line is coated with a release agent. With the base plate of the mold assembly horizontal, the model is moved into operative position, similar to that of FIG. 2, and two spacer plates 38 of approximately 3/16 inch thickness are positioned on the base plate, one each end of the sole molds between cooperating faces of the side molds, in the manner seen in FIG. 1. The side molds 12 are moved toward their closed positions into engagement with the spacer plates 38 so the faces 17 of the welt plates 16 are spaced outwardly of the feather line of the model. A temporary seal is then formed between the faces 17 of the welt plates and the feather line of the model by inserted material. A cold-curing polyurethane-forming mixture, or other suitable material, adapted to provide a cured material having a hardness of between 50 and 85 Durometer (Shore A) is cast into the space between the model, the upper surface of the welt plate and the wall and roof portions of the bracket 20 of each side mold. On completion of curing, the two sealing members 30 of the two side molds are thus formed in situ. The mold assembly is then opened, the spacer plates are removed and the model is removed to complete the mold assembly.

It should be understood that various substitutions of equivalent materials and elements other than those described above may be made without departing from the scope of the following claims:

I claim

1. A method of making shoe mold seals including the steps of: providing a mold assembly adapted to form a mold cavity in the form of a shoe bottom unit and including a plurality of movable side molds; providing each side mold with a substantially rigid closure portion contoured to engage a lasted shoe upper assembly located in operative position relative to the mold assembly; mounting a model of a shoe on which a bottom is to be formed; moving the side molds toward a closed condition in which the closure portions are spaced outwardly from the sides of said model; temporarily filling the space between the closure portions and the sides of the model with a removable material; forming a mold cavity having at least a bottom, made of said closure portions and said removable material, and said model as a boundary for said cavity; and casting onto the closure portions and into said mold cavity a fluid material which when solidified forms a resilient deformable sealing member.

2. A method according to claim 1 wherein the mold cavity is completed by the step of securing elongated members having upstanding walls on the closure portions of the side molds spaced outwardly from and following the contoured parts of the side molds, and the casting step includes casting the fluid material in a space between the sides of the model and the walls of said members.

* * * * *